United States Patent Office 2,898,154
Patented Aug. 4, 1959

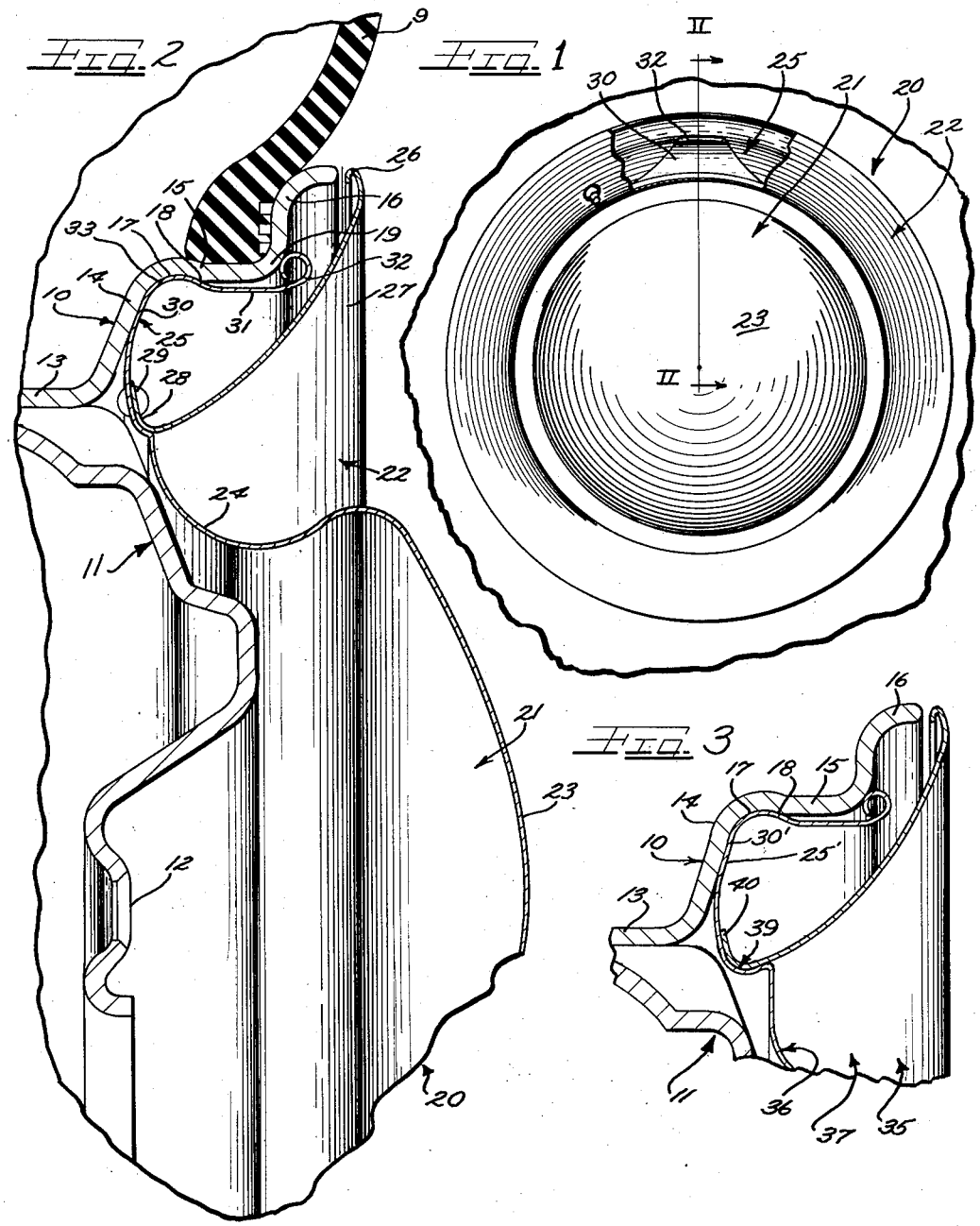

2,898,154

WHEEL COVER

George Albert Lyon, Detroit, Mich.

Application September 15, 1955, Serial No. 534,537

2 Claims. (Cl. 301—37)

This invention relates generally to a wheel cover and more particularly to a multi-part wheel cover having novel retaining means for maintaining the cover on the wheel.

In the automobile industry there is a never ending search for new type of wheel covers possessing highly ornamental qualities and having retaining means capable of meeting the required tests of performance. That is, the retaining means must be capable of maintaining the cover on the wheel not withstanding high speed shocks and impacts tending to dislodge the same.

Accordingly, it is an object of this invention to provide an ornamental wheel cover having novel retaining means thereon.

Still another object of this invention is to provide a multi-part cover construction which may be preferably either of the interlocked type or attached type and having novel retaining means for maintaining the cover on the wheel.

A further object of this invention is to provide an ornamental multi-part cover having novel retaining means which cover lends itself to mass production on an economical scale.

In accordance with the general features of this invention there is provided in a wheel structure having rim and body parts with one of these parts having a generally axial flange merging into a generally radial flange defining at their junction a first shoulder and with the axial flange provided with a second shoulder axially rearwardly of the first shoulder, a circular member for overlying disposition on the wheel, said cover having circumferentially spaced cover retaining portions on the underside of the cover capable of snap-on retained engagement behind the second shoulder, said retaining portions each terminating in an offset extremity capable of bottomed engagement against the wheel at the first shoulder in order to provide a stop capable of resisting inward deflection of the cover and a pry-off edge by which the cover retaining portions may be pried from the wheel.

Still another feature of this invention relates to providing for the wheel individual cover members capable of being connected together with the retaining portions comprising integral extensions from one of the cover members.

A further feature of this invention relates to the above mentioned offset extremity comprising a curled pry-off bead.

Other objects and features of this invention will more fully appear from the following detailed description taken in connection with the accompanying drawing which illustrates several embodiments thereof and in which:

Figure 1 is a fragmentary side view of a wheel structure having a novel cover mounted thereon;

Figure 2 is an enlarged fragmentary cross sectional view taken on substantially the line II—II of Figure 1 looking in the direction indicated by the arrows; and Figure 3 is an enlarged fragmentary cross sectional view of a modified form of my invention.

As shown on the drawing:

My invention is applicable to a conventional automobile such as one including a pneumatic tire 9 which may be either of the tube or tubeless type and is supported in the usual way upon a multi-flange drop center type tire rim 10 which in turn is carried by a dished metallic body part 11. The tire rim and body parts 10 and 11 are secured together at spaced intervals in a manner well known to those familar with this art, and the points of attachment alternate with transverse wheel openings through which air can flow to assist in cooling the wheel and especially the brake drum (not shown).

The center part of the dished wheel body part 11 has a deep pressed bolt-on flange 12 adapted to be fastened or bolted by any suitable means (not shown) to a flange on an axle of an automobile wheel.

The tire rim 10 includes a series of stepped flanges namely, attachment flange 13, generally radial flange 14, generally axial flange 15, and generally radial and then axial terminal flange 16. It will be noted that at the junction of the flanges 14 and 15 there is provided an annular groove 17 including an annular retaining shoulder 18. This shoulder 18 is known in the wheel art as defining a bead safety groove on the inside of rim flange 15 for locking the associated tire bead to the rim. Additionally, it will be noted that at the junction of the flanges 15 and 16 there is provided an annular shoulder 19 which serves a purpose as will hereinafter become apparent.

Cooperable with the previously described wheel is my novel cover 20 having inner and outer cover members 21 and 22.

The inner cover member 21 includes an enlarged central crown area 23 which terminates in a concave generally axially inwardly radially outwardly extending portion or margin 24. Integrally attached to the outer margin 24 of the inner cover member 21 is my novel retaining means 25 which will be later described.

The outer cover member 22 includes a curled under pry-off edge 26 which merges with a generally radially and axially inwardly extending portion 27 and terminates in an attachment portion 28. The inner and outer cover members 21 and 22 define together a draw area, with the cover members, and more particularly the retaining means 25, and attachment flange 28 being joined together at circumferentially spaced intervals by rivets or the like 29.

The retaining means 25 includes a generally radially outwardly slight concave bowed portion 30 which merges with generally axially outwardly slightly radially inwardly extending portion 31 terminating in a radially offset extremity or curled pry-off bead 32. The axially inner end of axial portion 31 is provided with an offset retaining portion 33 of generally complementary configuration to groove 17.

The junction of the portions 30 and 31 at 33 is positioned slightly axially outwardly of the junction of portion 30 and attachment flange 28 thus providing maximum rigidity at the point of attachment with flange 28 of the cover member 22 while at the same time providing greatest resiliency where the offset portion 33 is snapped behind shoulder 18 in groove 17.

Assembly of the cover on the wheel may be effected by first aligning or centering the cover with respect to the wheel and thereafter engaging the retaining means 25 with the shoulder 18 of the wheel and thereafter stressing and camming the retaining means or portions 25 over axial flange 15 until the offset retaining portion 33 snaps behind shoulder 18 in groove 17. It will be appreciated that the axial portion is of a slightly larger diameter than the inside diameter of rim flange 15 so that when the cover is mounted on the wheel the offset retaining portion 33 will be under tension.

In assembly it will be noted that pry-off edge 32 provides a stop in order to limit axial inward movement of the cover and tends to cushion impacts due to its curled construction. Additionally, the pry-off bead 32 tends to hold the axially outer end of portion 31 out of engagement from the axial flange 15 of the tire rim so that the retaining means is only engaged with the tire rim generally about groove 17.

In removing the cover from the wheel, a suitable pry-off tool is initially slipped between rim flange 16 and cover edge 26 with the end of the tool being forced under pry-off edge or bead 32. Upon twisting of the tool and an axially outward ejection of the bead 32 the cover may be dislodged from the wheel.

In Figure 3 there is shown a modified form of my invention with similar parts being shown by the same numerals as in the first form of my invention.

Cover 35 includes inner and outer cover members 36 and 37 which are much the same construction as the cover members 21 and 22 in the first form of my invention except that the inner margin 38 of inner cover member 36 is provided with a seat 39 into which the axially inner margin 40 of outer cover member 37 is adapted to nestingly engage in interlocked relationship. This is contrasted to the first form of my invention where the cover members are riveted together. The retaining means 25' operates in a similar fashion as in the first form of my invention.

In both forms of my invention it will be appreciated that the cover retaining portions 25 and 25' are of a wider circumferential dimension at the junction with the cover than at the place of engagement between the retaining portion and rim shoulder 18 so as to provide maximum rigidity at the connection of the cover members and resiliency in the radial portion 30 and 30' thereby allowing tensioned engagement between the cover and wheel.

In assembly of the cover 35, the cover members 36 and 37 are initially assembled together with inner margin 40 interlocked with seat 39 of inner cover member 36. Assembly and removal of the cover upon the wheel may be effected in an otherwise similar manner.

It will be understood that modifications and variations may be effected without departing from the scope of the novel concepts of the present invention.

I claim as my invention:

1. In a wheel structure, a wheel having a stepped multi-flanged tire rim and a body part with the rim having a generally radially extending axially inner rim flange connected to an axially extending intermediate rim flange merging into a generally radially extending axially outer rim flange with the axially outer radial rim flange terminating in an axially outwardly extending terminal rim flange and with the intermediate rim flange having an annular axially inwardly facing shoulder disposed generally at the juncture of the axially inner radial rim flange and the intermediate rim flange and with an annular abutment disposed at the juncture of the intermediate rim flange and the axially outer radially extending rim flange, a metallic circular cover member having an outer cover margin disposed radially inwardly of the intermediate rim flange, said cover margin having circumferentially spaced cover retaining extensions extending radially outwardly of the cover margin, said extensions having radial and axial extension portions with the axial extension portions having rim engaging areas arranged in a common circle having a diameter slightly in excess of the inside diameter of the intermediate rim flange for snap-on cover retained engagement with the intermediate rim flange behind the annular rim shoulder and with the radial portion adapted for bottomed engagement against the axially inner radially extending rim flange, said axial extension portions each terminating in an offset extremity which extremity confronts and is disposed on the axially outer side of the annular rim abutment providing a pry-off edge by which the cover retaining portions may be pried from the wheel, and a rigid outer ring member having its inner ring margin connected to said cover generally at the junction of the cover margin and said extensions and with said outer ring member extending radially outwardly from the inner ring margin into axially spaced confronting disposition relative to the axially outer radial rim flange and the terminal rim flange as well as the wheel and thereby at all times permitting a pry-off tool to be inserted into the space between the ring and the tire rim and be applied to the pry-off edge to release the tension between the extensions and the tire rim and allow the ring as well as the cover member to be removed from the wheel.

2. In a wheel structure, a wheel having a stepped multi-flanged tire rim and a body part with the rim having an axially extending intermediate rim flange merging into a generally radially extending axially outer rim flange and with the intermediate axially extending rim flange and the axially outer radially extending rim flange provided with an annular rim shoulder and with the axially outer radial rim flange terminating in an axially outwardly extending terminal rim flange, a metallic circular cover member having an outer cover margin disposed radially inwardly of the intermediate rim flange, said cover margin having circumferentially spaced cover retaining extensions extending radially outwardly of the cover margin, said extensions having radial and axial extension portions with the axial extension portions having rim engaging areas arranged in a common circle having a diameter slightly in excess of the inside diameter of the intermediate rim flange for cover retaining engagement with the intermediate rim flange, said axial extension portions each terminating in an offset extremity which extremity confronts and is disposed on the axially outer side of the annular rim shoulder providing a pry-off edge by which the cover retaining portions may be pried from the wheel, and a rigid outer ring member having its inner ring margin connected to said cover generally at the junction of the cover margin and said extensions and with said outer ring member extending radially outwardly from the inner ring margin into axially spaced confronting disposition relative to the axially outer radial rim flange and the terminal rim flange as well as the wheel and thereby at all times permitting a pry-off tool to be inserted into the space between the ring and the tire rim and be applied to the pry-off edges to release the tension between the extensions and the tire rim and allow the ring as well as the cover member to be removed from the wheel.

References Cited in the file of this patent
UNITED STATES PATENTS

| | | |
|---|---|---|
| 2,368,246 | Lyon | Jan. 30, 1945 |
| 2,421,756 | Lyon | June 10, 1947 |
| 2,490,822 | Lyon | Dec. 13, 1949 |
| 2,683,632 | Lyon | July 13, 1954 |